US008575489B2

(12) United States Patent
Oka et al.

(10) Patent No.: US 8,575,489 B2
(45) Date of Patent: Nov. 5, 2013

(54) THREE-CONDUCTOR CABLE

(75) Inventors: Fumihito Oka, Hitachi (JP); Hirotaka Eshima, Hitachi (JP)

(73) Assignee: Hitachi Cable, Ltd., Chiyoda-Ku, Tokyo (JP)

( * ) Notice: Subject to any disclaimer, the term of this patent is extended or adjusted under 35 U.S.C. 154(b) by 55 days.

(21) Appl. No.: 13/137,200

(22) Filed: Jul. 27, 2011

(65) Prior Publication Data

US 2012/0199390 A1 Aug. 9, 2012

(30) Foreign Application Priority Data

Feb. 4, 2011 (JP) ................................ 2011-022891

(51) Int. Cl.
*H01B 7/00* (2006.01)
*H02G 3/03* (2006.01)

(52) U.S. Cl.
USPC ...................... 174/113 R; 174/15.5; 174/115

(58) Field of Classification Search
USPC .................................. 174/113 R, 115, 15.5
See application file for complete search history.

(56) References Cited

U.S. PATENT DOCUMENTS

| | | | | |
|---|---|---|---|---|
| 1,089,642 | A * | 3/1914 | Honold | 174/70 R |
| 3,461,218 | A * | 8/1969 | Buchhold | 174/15.5 |
| 3,800,062 | A * | 3/1974 | Kataoka et al. | 174/15.5 |
| 4,176,238 | A * | 11/1979 | Vulis et al. | 174/15.5 |
| 7,094,973 | B2 * | 8/2006 | Ashibe et al. | 174/125.1 |
| 7,550,674 | B2 * | 6/2009 | Jean | 174/110 R |
| 2008/0090732 | A1 * | 4/2008 | Hirose | 505/230 |
| 2008/0312089 | A1 * | 12/2008 | Jang et al. | 505/231 |
| 2012/0186845 | A1 * | 7/2012 | Eshima et al. | 174/15.6 |

FOREIGN PATENT DOCUMENTS

| | | |
|---|---|---|
| JP | 2000-133058 | 5/2000 |
| JP | 2001-202837 | 7/2001 |

OTHER PUBLICATIONS

Office Action dated Apr. 16, 2013 in U.S. Appl. No. 13/200,922.

* cited by examiner

*Primary Examiner* — Chau Nguyen
(74) *Attorney, Agent, or Firm* — McGinn IP Law Group, PLLC

(57) ABSTRACT

A three-conductor cable includes three cables disposed in a triangular form in a cross sectional view thereof, and a first refrigerant path at a cable center portion surrounded by the three cables along a longitudinal direction of the three cables for flowing a refrigerant for cooling the three cables therethrough. The first refrigerant path is formed along a part of each of the three cables in a cross sectional view thereof.

18 Claims, 1 Drawing Sheet

1, 21 THREE-CONDUCTOR CABLE
2 CABLE
3 FIRST REFRIGERANT PATH
4 CONDCUTOR
6 SECOND REFRIGERANT PATH

THREE-CONDUCTOR CABLE

The present application is based on Japanese patent application No. 2011-022891 thed on Feb. 4, 2011, the entire contents of which are incorporated herein by reference.

BACKGROUND OF THE INVENTION

1. Field of the Invention

This invention relates to a three-conductor cable used as a feeding cable etc. for an in-wheel motor.

2. Description of the Related Art

Heretofore, many cables (or electrically conducting path) with cooling functions are disclosed (e.g., JP-A-2000-133058, JP-A-2001-202837).

In recent years, a feeding cable for an in-wheel motor (i.e., a motor enclosed in a vehicle wheel) has been increasingly researched.

SUMMARY OF THE INVENTION

The inventors of the invention have tried to add cooling functions to feeding three cables connected to the in-wheel motor.

Because, by adding the cooling functions to the feeding three cables connected to the in-wheel motor, many merits can be obtained that heat generated from each cable can be dissipated and, moreover, the in-wheel motor as well as heat generated in the in-wheel motor and transmitted to the cables can be simultaneously and efficiently cooled.

However, even if the inventions disclosed by JP-A-2000-133058 and JP-A-2001-202837 could be applied to the feeding three cables connected to the in-wheel motor, the following problems may arise.

In JP-A-2000-133058, an outgoing path 10 is formed such that a tube for flowing a refrigerant therethrough is arranged spirally on a periphery of a cable. However, if the three cables are each provided with the tube like the outgoing path 10, the whole size becomes too large to be suited for a vehicle needing compactness. The tube like the outgoing path 10 may be hooked by another member and, thus, another problem may arise that the cable is very difficult to arrange.

By the way, although the tube like the outgoing path 10 may be provided on the periphery of the three cables, the problems may still arise that the whole size becomes too large and the cable arrangement performance is low.

In JP-A-2001-202837, a cable is wholly enclosed by a heat-insulating tube and a refrigerant is supplied in the heat-insulating tube. Thus, as well as JP-A-2000-133058, the problem may arise that the whole size becomes too large.

Accordingly, it is an object of the invention to provide a three-conductor cable that is excellent in compactness of the whole size and in cable arrangement performance while having the cooling functions.

(1) According to one embodiment of the invention, a three-conductor cable comprises:

three cables disposed in a triangular form in a cross sectional view thereof; and a first refrigerant path at a cable center portion surrounded by the three cables along a longitudinal direction of the three cables for flowing a refrigerant for cooling the three cables therethrough, wherein the first refrigerant path is formed along a part of each of the three cables in a cross sectional view thereof.

In the above embodiment (1) of the invention, the following modifications and changes can be made.

(i) The three cables each comprise a conductor comprising a twisted wire with a plurality of wires twisted.

(ii) The three cables each comprise a second refrigerant path formed along a longitudinal direction of each of the three cables for flowing the refrigerant therethrough.

(iii) The first refrigerant path and the second refrigerant path are connected with each other at an end portion thereof such that the refrigerant is commonly flown through the first refrigerant path and the second refrigerant path to allow the common refrigerant to reciprocate through the first refrigerant path and the second refrigerant path.

POINTS OF THE INVENTION

According to one embodiment of the invention, a three-conductor cable is constructed such that it uses a dead space defined at a cable center portion when three cables are disposed in a triangular form in the cross sectional view. A first refrigerant path is formed at the dead space, it can be more compact than the prior art where the refrigerant path is separately formed on the periphery of the cable. Also, the three-conductor cable is excellent in cable arrangement performance since it has no refrigerant flowing tube protruding outward as disclosed in the prior art. Accordingly, the three-conductor cable of the embodiment can be excellent in compactness of the whole size and in cable arrangement performance while having the cooling functions.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

The preferred embodiments of the invention will be described below.

Embodiment

Figure 1:
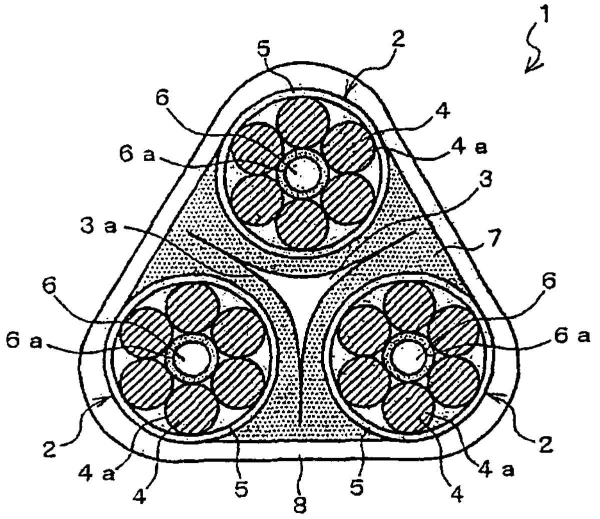
FIG. 1 is a cross sectional view showing a three-conductor cable in an embodiment according to the invention.

FIG. 1 is a cross sectional view showing a three-conductor cable in an embodiment according to the invention.

As shown in FIG. 1, the three-conductor cable 1 comprises three cables 2 disposed in a triangular form in a cross section thereof, and a first refrigerant path 3 for flowing a refrigerant for cooling the three cables 2.

The three cables 2 are, e.g., a feeding cable (or feeding wiring) for supplying power to an in-wheel motor installed in a vehicle wheel. In this embodiment, the three cables 2 are arranged such that three lines connecting the two adjacent centers (in the cross sectional view) of the three cables 2 form substantially an equilateral triangle in the cross section.

The three cables 2 each comprise a conductor 4 and an insulator 5 formed on the periphery of the conductor 4. In this embodiment, the conductor 4 is a twisted wire with plural wires 4*a* twisted each other.

Also, at the center (in the cross sectional view) of each cable 2, a second refrigerant path 6 for flowing a refrigerant therethrough is formed along the longitudinal direction of each cable 2. The second refrigerant path 6 is formed of a follow portion of a tube (e.g., a rubber tube) 6*a*. The conductor 4 is disposed spirally winding the wires 4*a* on the periphery of the tube 6*a*. The tube 6*a* may be a metallic tube such as an aluminum tube.

At the center portion (of the three-conductor cable 1 in the cross sectional view) among the cables sandwiched or surrounded by the three cables 2, the first refrigerant path 3 for flowing the refrigerant therethrough is formed along the longitudinal direction of the three cables 2. In this embodiment, a cable supporting member 7 is among the three cables 2 for supporting or retaining the positional relationship of the three cables 2. The first refrigerant path 3 is formed by providing a follow portion extending along the longitudinal direction at the center (in the cross sectional view) of the cable supporting member 7.

The refrigerant used may be a cooled water though not limited to this. The cable supporting member 7 is desirably of a material with high heat conductivity and flexibility, while that material may be suitably determined in consideration of heat resistance, chemical stability to the refrigerant material, etc. In this embodiment, the cable supporting member 7 is a rubber system material.

The first refrigerant path 3 is formed such that the cross sectional form thereof on the refrigerant side is along a part (i.e., a part in circumference) of each of the three cables 2. In this embodiment, the first refrigerant path 3 is constructed such that three arcs 3*a* are formed along a part (on the side of the cable center portion) of each of the three cables 2, i.e., along the lower part of the upper cable 2, the upper right part of the lower left cable 2, and the upper left part of the lower right cable 2, and the ends of the adjacent two arcs 3*a* are connected each other. The first refrigerant path 3 is formed with rotational symmetries through 120 degrees around the symmetrical point at the center of the three-conductor cable 1 in the cross sectional view.

Where the first refrigerant path 3 is thus formed along a part of each of the three cables 2, in flowing the refrigerant through the first refrigerant path 3, the contact area (i.e., the heat exchange area) between the refrigerant and the three cables 2 can be increased to enhance the cooling efficiency. Also, in this embodiment, since the conductor 4 of the three cables 2 is formed with the twisted wire, even when only a part in circumference of each cable 2 is cooled, the conductor 4 of each cable 2 can be evenly cooled by cooling the part in the longitudinal direction of the cable 2.

Also, though not shown, the three-conductor cable 1 is constructed such that the first refrigerant path 3 and the second refrigerant path 6 are connected each other at the end (i.e., the end of the three-conductor cable 1) thereof and the common refrigerant is flown through the first refrigerant path 3 and the second refrigerant path 6 so as to reciprocate therein. In this embodiment, the second refrigerant path 6 is used as an outgoing path and the first refrigerant path 3 is used as an incoming path. Alternatively, the first refrigerant path 3 may be used as the outgoing path and the second refrigerant path 6 may be used as the incoming path.

Also, the three-conductor cable 1 is constructed such that a sheath (or jacket) 8 is disposed to cover the three cables 2 and the cable supporting member 7 for protecting the three cables 2 and the cable supporting member 7.

The effects of the embodiment will be described below.

The three-conductor cable 1 of the embodiment is constructed such that the first refrigerant path 3 for flowing the refrigerant for cooling the three cables 2 is formed at the center portion surrounded by the three cables 2 along the longitudinal direction of the three cables 2, and the first refrigerant path 3 is in the cross section formed along a part of each of the three cables 2.

The three-conductor cable 1 uses a dead space defined at the cable center portion when the three cables 2 are disposed in a triangular form in the cross sectional view. Thus, since the first refrigerant path 3 is formed at the dead space, it can be more compact than the prior arts disclosed in JP-A-2000-133058 and JP-A-2001-202837 where the refrigerant path is separately formed on the periphery of the cable. Also, the three-conductor cable 1 is excellent in cable arrangement performance since it has no refrigerant flowing tube protruding outward as disclosed in JP-A-2000-133058.

Accordingly, the three-conductor cable 1 of the embodiment can be excellent in compactness of the whole size and in cable arrangement performance while having the cooling functions.

Also, the three-conductor cable 1 of the embodiment can enhance the cooling efficiency by forming the first refrigerant path 3 along a part of each of the three cables 2 such that the heat exchange area between the first refrigerant path 3 flowing refrigerant and the three cables 2 increases, as well as utilizing the dead space as mentioned above as much as possible.

Furthermore, since the three-conductor cable 1 uses the twisted wire as the conductor 4 of the three cables 2, the whole conductor 4 of the three cables 2 can be evenly cooled.

Also, the three-conductor cable 1 can further enhance the cooling effect for the three cables 2 by forming the second refrigerant path 6 at the center of each of the three cables 2 and along the longitudinal direction of the three cables 2. In addition, by connecting the first refrigerant path 3 and the second refrigerant path 6 at the end portion of the three-conductor cable 1, the refrigerant can reciprocate in the three cables 2. As a result, the three cables 2 can be cooled by using not only the outgoing path but also the incoming path so as to suppress the temperature rise of the cables 2. Also, a means (e.g., a refrigerant tank, a cooling unit for cooling the refrigerant, a circulation pump etc.) for circulating the refrigerant can be disposed at one end of the three-conductor cable 1 so as to simplify the system.

Other Embodiment

The other embodiment of the invention will be described below.

Figure 2:
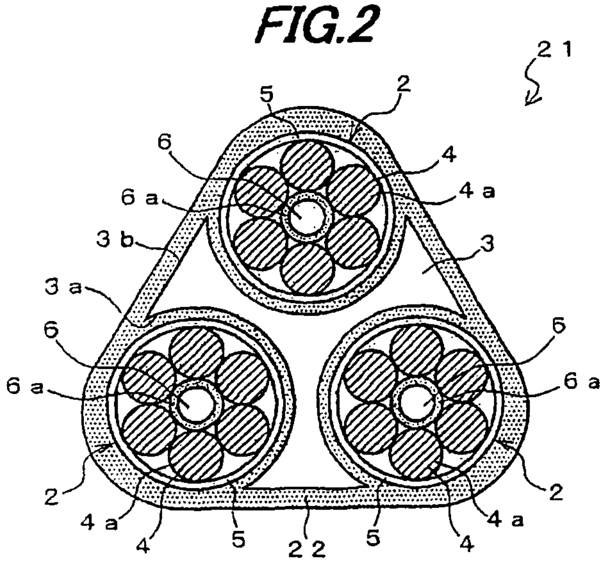
FIG. 2 is a cross sectional view showing a three-conductor cable in another embodiment according to the invention.

As shown in FIG. 2, a three-conductor cable 21 is constructed such that the cable supporting member 7 and the sheath 8 of the three-conductor cable 1 as in FIG. 1 are integrally formed to change the form of the first refrigerant path 3 as in FIG. 1. In this embodiment, the integrated member of the cable supporting member 7 and the sheath 8 is called a cable supporting member 22.

The cable supporting member 22 is integrally formed by, e.g., extrusion. The hollow portion as the first refrigerant path 3 can be simultaneously formed during the extrusion.

The three-conductor cable 21 is constructed such that as compared to the three-conductor cable 1 in FIG. 1, the length of the arc 3*a* of the first refrigerant path 3 is elongated, and the first refrigerant path 3 is expanded to the gap between the adjacent cables 2 other than the cable center portion. By expanding the first refrigerant path 3, the ends of the adjacent arcs 3*a* are away from each other. Thus, in this embodiment, the first refrigerant path 3 is formed by connecting the ends of the adjacent arcs 3*a* with a linear portion 3*b*. The linear portion 3*b* is formed nearly parallel to the outer wall of the three-conductor cable 21.

The cable supporting member 7 of the three-conductor cable 21 has the thin outer wall due to the first refrigerant path 3 expanded to the gap between the adjacent cables 2. Therefore, the cable supporting member 7 is likely to be deformed so that the first refrigerant path 3 may be crushed. As a measure for preventing the crush or deformation, a rib-like shape holding member (not shown) may be disposed in the first refrigerant path 3 so as to hold the shape of the cable supporting member 7 and prevent the crush of the first refrigerant path 3.

The three-conductor cable 21 of this embodiment can, as compare to the three-conductor cable 1 in FIG. 1, allow the heat exchange area between the first refrigerant path 3 flowing refrigerant and the three cables 2 to further increase so as to further enhance the cooling efficiency. Further, since the flow path at a part near the periphery of the protector 21 of the first refrigerant path 3 is expanded, the refrigerant can be easily flown at the part near the periphery of the three-conductor cable 21 to further enhance the cooling efficiency.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, although in the above embodiments the first refrigerant path 3 is defined as a hollow portion in the cable supporting member 7 or 22, a rubber tube may be sandwiched by the three cables 2 to deform thereby, and the hollow portion of the deformed may be used as the first refrigerant path 3.

Although in the above embodiments the second refrigerant path 6 is formed in each of the three cables 2, it is not always necessary and may be omitted. In this case, the first refrigerant path 3 may be divided into two paths by, e.g., forming a partition in the first refrigerant path 3, where one of the divided first refrigerant paths 3 can be used as an outgoing path and another thereof can be used as an incoming path such that the refrigerant can reciprocate therein. Meanwhile, when two first refrigerant paths 3 are used, one of the first refrigerant paths 3 can be used as an outgoing path and another thereof can be used as an incoming path without dividing the first refrigerant path 3.

Although in the above embodiments the three cables 2 are arranged such that three lines connecting the two adjacent centers (in the cross sectional view) of the three cables 2 form substantially an equilateral triangle in the cross section, the invention is not limited to this. The three cables 2 may be disposed in a triangular form in the cross sectional view.

Although in the above embodiments the first refrigerant path 3 is formed with rotational symmetries through 120 degrees around the symmetrical point at the center of the three-conductor cable 1 or 21 in the cross sectional view, the first refrigerant path 3 may not formed exactly with rotational symmetries.

Although in the above embodiments the three-conductor cable 1 or 21 is used as a feeding wiring for supplying power to the in-wheel motor, the invention may be also applied to another use.

What is claimed is:

1. A three-conductor cable, comprising:

three cables disposed in a triangular form in a cross sectional view thereof;

a first refrigerant path at a cable center portion surrounded by the three cables along a longitudinal direction of the three cables for flowing a refrigerant for cooling the three cables therethrough; and a cable supporting member for supporting a positional relationship of the three cables, wherein the first refrigerant path is formed in the cable supporting member along a part of each of the three cables in a cross sectional view thereof, wherein the three cables each comprise a second refrigerant path formed along a longitudinal direction of said each of the three cables for flowing the refrigerant therethrough, and wherein the first refrigerant path and the second refrigerant path are connected with each other at an end portion thereof such that the refrigerant is commonly flown through the first refrigerant path and the second refrigerant path to allow the common refrigerant to reciprocate through the first refrigerant path and the second refrigerant path with using one of the first refrigerant path and the second refrigerant path as an outgoing path and another one of the first refrigerant path and the second refrigerant path as an incoming path.

2. A three-conductor cable, comprising:

three cables disposed in a triangular form in a cross sectional view thereof;

a first refrigerant path at a cable center portion surrounded by the three cables along a longitudinal direction of the three cables for flowing a refrigerant for cooling the three cables therethrough; and a cable supporting member for supporting a positional relationship of the three cables, wherein the first refrigerant path is formed in the cable supporting member along a part of each of the three cables in a cross sectional view thereof, wherein the three cables each comprise a second refrigerant path formed along a longitudinal direction of said each of the three cables for flowing the refrigerant therethrough, and wherein the first refrigerant path and the second refrigerant path are connected with each other to allow a common refrigerant to flow through the first refrigerant path and the second refrigerant path with using one of the first refrigerant path and the second refrigerant path as an outgoing path and another one of the first refrigerant path and the second refrigerant path as an incoming path.

3. A three-conductor cable, comprising:

three cables disposed in a triangular form in a cross sectional view thereof;

a first refrigerant path at a cable center portion surrounded by the three cables along a longitudinal direction of the three cables for flowing a refrigerant for cooling the three cables therethrough; and a cable supporting member for supporting a positional relationship of the three cables, wherein the first refrigerant path is formed in the cable supporting member along a part of each of the three cables in a cross sectional view thereof, wherein the three cables each comprise a second refrigerant path formed along a longitudinal direction of said each of the three cables for flowing the refrigerant therethrough, and wherein a common refrigerant flows through the first refrigerant path and the second refrigerant path with using one of the first refrigerant path and the second refrigerant path as an outgoing path and another one of the first refrigerant path and the second refrigerant path as an incoming path.

4. The three-conductor cable according to claim 3, wherein the three cables each comprise a conductor comprising a twisted wire with a plurality of wires twisted.

5. The three-conductor cable according to claim 3, wherein the common refrigerant flows through the first refrigerant path in a different direction from a direction that the common refrigerant flows through the second refrigerant path.

6. The three-conductor cable according to claim 3, wherein said each of the three cables comprises a conductor comprising a plurality of wires twisted around the second refrigerant path.

7. The three-conductor cable according to claim 6, wherein the second refrigerant path comprises a hollow portion of a tube, said plurality of wires being twisted on a periphery of the tube.

8. The three-conductor cable according to claim 3, wherein the cable supporting member spaces apart one of the three cables from two of the three cables.

9. The three-conductor cable according to claim 3, wherein the cable supporting member spaces apart an entirety of said each of the three cables from other cables of the three cables.

10. The three-conductor cable according to claim 3, wherein the cable supporting member is disposed among the three cables.

11. The three-conductor cable according to claim 3, wherein the first refrigerant path comprises a hollow portion extending along the longitudinal direction of the three cables at a center of the cable supporting member.

12. The three-conductor cable according to claim 3, wherein the cable supporting member comprises a rubber.

13. The three-conductor cable according to claim 3, wherein the first refrigerant path is formed such that a cross sectional form thereof on a refrigerant side is along a circumference of said each of the three cables.

14. The three-conductor cable according to claim 3, further comprising:

a sheath that is disposed on a surface of said each of the three cables and on a surface of the cable supporting member.

15. The three-conductor cable according to claim 3, further comprising:

a sheath that is disposed on a surface of said each of the three cables, wherein the cable supporting member is an integral part of the sheath.

16. A three-conductor cable, comprising:

three cables disposed in a triangular form in a cross sectional view thereof;

a first refrigerant path at a cable center portion surrounded by the three cables along a longitudinal direction of the three cables for flowing a refrigerant for cooling the three cables therethrough; and a cable supporting member for supporting a positional relationship of the three cables, wherein the first refrigerant path is formed in the cable supporting member along a part of each of the three cables in a cross sectional view thereof, and wherein a periphery of the first refrigerant path includes a first arc along a lower part of an upper cable of the three cables, a second arc along an upper right part of a lower left cable of the three cables, and a third arc of an upper left part of a lower right cable of the three cables.

17. The three-conductor cable according to claim 16, wherein ends of two adjacent arcs of the first arc, the second arc, and the third arc are connected to each other.

18. The three-conductor cable according to claim 16, wherein the first refrigerant path comprises a space formed by connecting ends of two adjacent arcs of the first arc, the second arc, and the third arc with a linear portion of a sheath that is disposed on a surface of the cable supporting member.

* * * * *